Aug. 17, 1948.　　　F. A. HELFRECHT　　　2,447,411
FLUID SEAL
Filed July 5, 1945
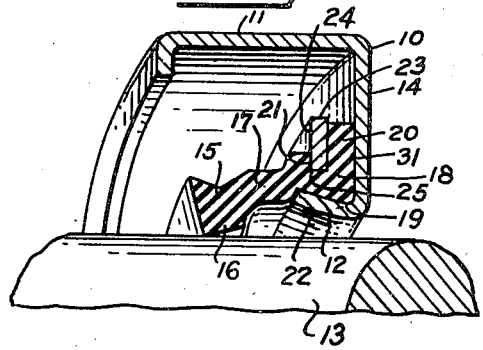
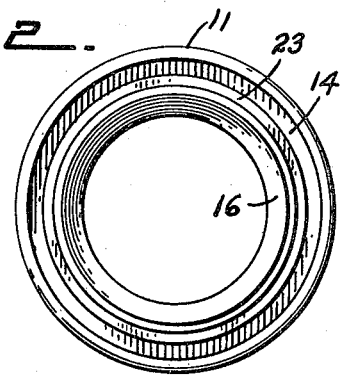
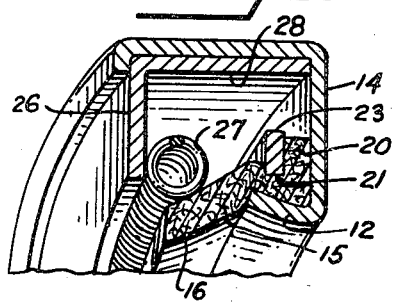
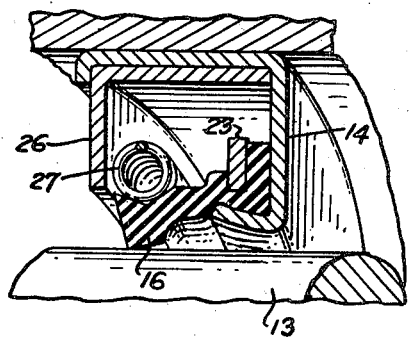
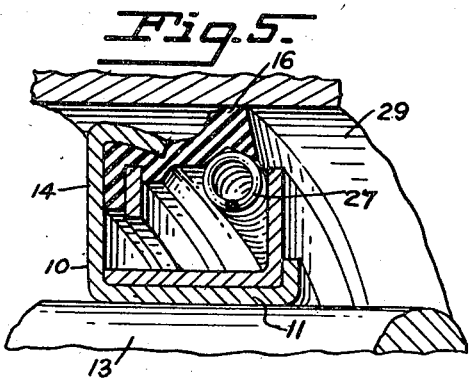
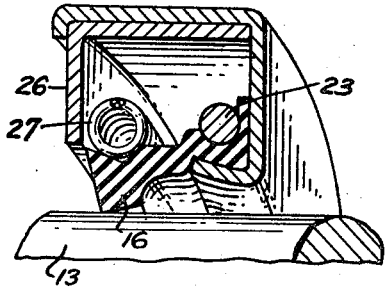
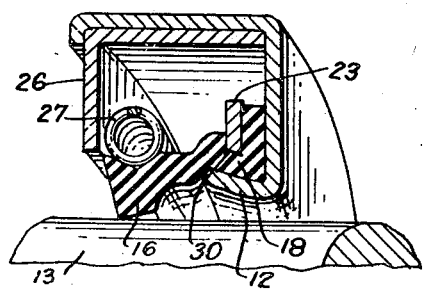
INVENTOR.
FRED A. HELFRECHT
BY
ATTORNEY Patented Aug. 17, 1948

2,447,411

UNITED STATES PATENT OFFICE 2,447,411

FLUID SEAL

Fred A. Helfrecht, Redwood City, Calif., assignor to National Motor Bearing Co., Inc., Redwood City, Calif., a corporation of California Application July 5, 1945, Serial No. 603,358

2 Claims. (Cl. 288—3)

This invention relates to improvements in fluid seals and particularly to the type known in the art as self-contained units adapted for insertion between two relatively movable elements to seal the space between these elements.

The object of the present invention is to provide a fluid seal structure having advantages flowing from the shape and cooperative relationship of the component elements, which advantages are not possessed by any structures in the prior art.

For example, one object of the present invention is to provide a unitary fluid sealing device in which any tendency for the sealing element to be pulled from the case only results in tightening it therein.

Another object of this invention is to provide a fluid seal construction in which a minimum of stampings are present, and yet the parts are so shaped as to secure a leak-tight clamping of the sealing member in the case.

Another object of the invention is to provide a fluid seal structure made from a molded rubber or rubber-like material by means of which a mold for making the sealing element and the dies to stamp out the clamping ring or washer to fit a given shaft size may be used to manufacture sealing members for a wide variety of sizes of housing bores. This problem is particularly acute in the case of molded seals where the molds are costly. By this invention a seal to fit a given shaft size and several different bore openings may be mounted in a case in which the case is the only element changed to make the accommodation.

Another object of the present invention is to provide a fluid seal structure which is quickly and inexpensively assembled, so that the labor cost and handling operations are reduced to a minimum. This feature arises from the fact that when the sealing member has been molded or shaped, the securing washer or ring is inserted and then the sealing member and ring are fastened into the case with one principal operation, namely, imparting inclination to the inturned axial flange of the case.

The above enumerates just a few of the objects achieved by this invention, as other objects will become apparent to those skilled in the art who may have occasion to examine this specification.

It is to be understood that it is not my intention to limit the patent to the showing made by the drawings and description, as variations may be adapted from these preferred forms and still come within the invention set forth in the claims. The present description is intended to go no further in limiting the scope of the invention than is required by U. S. Revised Statute 4888.

In the drawings:

Fig. 1 is a cross-sectional view in perspective of a portion of a complete fluid sealing device in its simplest form;

Fig. 2 is a side elevation of a complete seal looking toward the device of Fig. 1 from the left-hand side;

Fig. 3 is a cross-sectional perspective view of a portion of a modified form of the device;

Figs. 4, 5, 6, and 7 are similar views of other modifications. In Fig. 5 the sealing member instead of sealing on the shaft is arranged to seal against the outer periphery of the housing bore.

In the device as shown in Fig. 1 there is the case member 10 having a cylindrical peripheral wall 11 adapted to make a leak-tight, non-rotating fit with one of the surfaces being sealed, a generally axial supporting flange 12, set at an angle to and spaced away from the other surface being sealed, such as the shaft 13, and a radial connecting wall 14 extending between the peripheral wall 11 and the inclined supporting flange 12.

The sealing member 15 may be of a molded rubber or rubber-like material or it may be of leather, of fabric or of paper. It is formed with a sealing lip 16 adapted to fit the moving surface being sealed, in this case the shaft 13, with a sliding, low-friction, substantially leak-tight fit. It has a flexible, somewhat conically flared connecting neck 17, which is provided with a gripping portion 18 at its flared end, and this gripping portion has an axial face 19 and a connected, radially-extended flared end 20. Also opposite to the axial face 19 it has a groove 21. Preferably this groove is farther from the sealing lip 16 than is the edge 22 of the axial supporting flange 12. In this groove 21, formed at the junction of the axial face 19 and the flared end 20, fits an annular ring 23. Due to the inclined setting of the axial flange 12 of the case member, the tendency is for the ring 23 to force the axial face 19 and the flared end 20 into a secure, leak-tight, non-rotating contact with the inner axial and radial surfaces of the case parts 12 and 14 against which they bear.

When in assembled position as shown in Fig. 1, it is preferable to have the innermost edge of the radial face 24 of the ring 23 (on the lip side of the sealing member) in contact with the axial portion 18 of the sealing member at a point 25 farther away from the lip 16 than where the end 22 of the supporting flange 12 contacts the sealing member.

The net effect of this is that should there be an end-wise reciprocating wobble to the shaft 13 or any other force created which would exert an axial pull on the sealing lip 16 which in turn would be transmitted into the clamping area beneath the ring 23, the effect is for the clamped portion 18 to be gripped tighter whenever it tends to move toward the lip 16 with respect to the point 22 on the clamping flange 12.

As noted earlier, one of the advantages of this invention is the simplification in its assembly and manufacture. When the sealing member 15 has been molded, the operator slips the ring 23 into the groove 21. At that time the axial supporting flange 12 is so directed that the axial face 19 of the sealing member will slide onto the same with ease. The device is then placed in an expanding die or in a spinning head and the clamping flange 12 is moved outwardly into a position somewhat as shown in Fig. 1 so that it is inclined with relation to the shaft 13. When in this position, the stronger the pull exerted on the lip 16 the tighter the ring 23 will grip the clamp end 18 of the sealing member.

The structure as shown in Fig. 1 is reduced to its fewest elements. A spring as shown in the other figures may be added, in which case it may be desirable to use an inner case and closure member 26 as illustrated in Fig. 3. Neither the spring 27 nor this end closure member are essential where the lip 16 of the sealing member is made of a material with sufficient resiliency to maintain itself in contact with the shaft surface at the operating speeds of the shaft. As shown in Fig. 1 this lip portion 16 of the sealing member may be thickened to build up whatever degree of resiliency or tension is needed to obtain the leak-tight fit with the shaft.

In the construction shown in Fig. 3 the sealing member 15 is made from leather or other flat moldable material. When the sealing member has been shaped to form a recess at 21 to receive the ring 23, the assembly of this structure and its operating characteristics are substantially like those of the device of Fig. 1. Because of the variation in hides it is not always safe to rely on the inherent resiliency of the leather sealing member to obtain the necessary sealing pressure at the sealing lip 16 on the shaft. Therefore a spring 27 is provided which is held in position over the sealing lip 16 by the end closure member 26. The end closure member may have the peripheral extension 28.

The device shown in Fig. 4, is substantially like the device already described in Fig. 1 except that here the spring 27 and the end closure member 26 are shown.

The device shown in Fig. 5 illustrates a form which any of these illustrated seal constructions may take when the engineer laying out a machine prefers to have the case member 10 press-fitted with its cylindrical peripheral wall 11 in leak-tight, non-rotating engagement on the shaft 13. In this case the sealing lip 16 engages with the bore wall 29 to provide the sliding leak-tight fit there instead of on the shaft. The spring 27 instead of being under tension is under compression. All the other parts operate in the same manner as they do in Fig. 4 and achieve the results sought by the present invention. It amounts simply to a reversal of the parts.

In the device of Fig. 6, the structure is substantially like that of Fig. 4 except that the ring 23 is made up of wire which may be round or hexagonal or any other shape in cross-section.

When the flat ring 23 as shown in Figs. 1, 3, 4, 5, and 7 is used, there is a likelihood that the flat sheet stock from which it is blanked will be wasted so far as the disc which formed the center is concerned. Wire has the advantage in manufacturing of having less wastage in materials, as it can be formed up and welded to form a ring with no waste of materials.

In the device as shown in Fig. 7, the annular ring 23 is formed with a sloping face 30 where it bears on the gripping portion 18 of the sealing member. This has the advantage of providing a uniform increase in compression on the whole gripping portion 18 whenever a pull is exerted at the sealing lip 16, tending to pull the sealing element and ring 23 off of the clamping flange 12. The round surface of the clamping ring shown in Fig. 6 has a somewhat similar and equivalent effect.

From the foregoing description it will now be apparent that by means of a mold to form the sealing member 15 for any given shaft size, this sealing member may be used in sealing between such a shaft and a housing bore 29 of varying sizes simply by changing the case 10 into which it is fastened by lengthening the radial connecting wall 14. This effects a very real economy. A further economy is effected in having the clamping ring 23 of less radial extent than the connecting wall 14. The inclination on the flange 12 assures that the ring 23 will be held in position to do its work, without any direct contact with the case 10 at any point. One further point about this clamping ring 23 is the fact that when the supporting flange 12 is spun or spread into the inclined position shown in the drawings, the inclination imparted to this flange 12 and the resiliency of the clamped portion 18 of the sealing member cooperate to create an axial force on the ring 23, urging it against the radial wall 14, thereby tightening the sealing member 15 in the case 10 along both its axial face 19 as well as along the radial face 31 of the flared end 20.

What is claimed is:

1. A fluid seal adapted to be inserted as a unit to seal the space between two relatively moving cylindrical surfaces comprising a case member having a cylindrical peripheral wall adapted to make a leak-tight, non-rotating fit with one of said surfaces; a generally axial supporting flange set at an angle to and spaced away from the other surface being sealed, and a radial connecting wall extending between said peripheral wall and said supporting flange; a sealing member having a sealing lip adapted to fit the moving surface being sealed with a sliding, substantially leak-tight fit, and a flexible outwardly-flared connecting neck which is provided with axial and radial sealing faces at its flared end, the opposite surface to said axial face having in addition to said radial flared end, a radial flange of lesser radial extent than said end spaced away from it sufficiently to form a recess; and an annular ring fitted tightly into said recess, said ring, due to the angular setting of said axial flange of the case member, serving to force said axial face and said flared end into leak-tight, non-rotating contact with the inner axial and radial surfaces of the case member against which they bear.

2. A fluid seal adapted to be inserted as a unit to seal the space between two relatively moving cylindrical surfaces comprising a case member having a cylindrical peripheral wall adapted to make a leak-tight, non-rotating fit with one of said surfaces, a generally axial supporting flange set at an angle to and spaced away from the other surface being sealed, and a radial connecting wall extending between said peripheral wall and said supporting flange; a molded sealing member having a resilient wiping lip in engagement with the moving surface being sealed and having at its opposite end a radially expanded, somewhat cylindrical, enlarged foot, one side and end of which foot engages said inclined, in-turned axial case flange and the radial wall of said case with a leak-tight fit, and the other side of which foot has an open ring-receiving groove formed therein by a pair of radial flanges, the flange on the side of said sealing lip being of less radial extent than the end flange compressed between the bottom of said case member; and a reinforcing ring in said groove.

FRED A. HELFRECHT.

REFERENCES CITED

The following references are of record in the file of this patent:

UNITED STATES PATENTS

| Number | Name | Date |
|---|---|---|
| 1,983,522 | Coultas | Dec. 11, 1934 |
| 2,200,925 | Johnson et al. | May 14, 1940 |
| 2,289,659 | Kosatka | July 14, 1942 |
| 2,319,067 | Kosatka | May 11, 1943 |
| 2,362,843 | Northrup | Nov. 14, 1944 |